United States Patent
Groff et al.

(10) Patent No.: US 7,962,776 B2
(45) Date of Patent: Jun. 14, 2011

(54) METHOD AND APPARATUS FOR DETECTING COMPONENT REMOVAL WHILE OPERATING IN A BATTERY BACKUP MODE

(75) Inventors: Steven Mark Groff, Tucson, AZ (US); Larry Juarez, Tucson, AZ (US); Joseph Dean Ohrazda, Tucson, AZ (US); Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 11/872,017

(22) Filed: Oct. 14, 2007

(65) Prior Publication Data

US 2009/0100282 A1   Apr. 16, 2009

(51) Int. Cl.
*G06F 1/00* (2006.01)
*G06F 12/00* (2006.01)
*G06F 11/00* (2006.01)
*H02J 1/10* (2006.01)
*H02J 7/00* (2006.01)
*G11C 5/14* (2006.01)

(52) U.S. Cl. ............ 713/340; 713/300; 307/44; 307/66; 320/107; 320/116; 320/126; 365/226; 711/112; 714/14; 714/22

(58) Field of Classification Search ............... 713/300, 713/340; 307/46, 66; 320/107, 116, 126; 365/226; 711/112; 714/14, 22
See application file for complete search history.

(56) References Cited

U.S. PATENT DOCUMENTS

| | | | |
|---|---|---|---|
| 2,006,018 A | 6/1935 | Goodall | |
| 5,373,478 A | 12/1994 | Komatsu et al. | |
| 5,589,719 A * | 12/1996 | Fiset | 307/131 |
| 6,079,026 A | 6/2000 | Berglund et al. | |
| 6,385,114 B1 | 5/2002 | Abe et al. | |
| 6,437,574 B1 | 8/2002 | Robinson et al. | |
| 6,700,829 B2 | 3/2004 | Abe et al. | |
| 6,888,267 B2 | 5/2005 | Floro et al. | |
| 6,993,680 B2 * | 1/2006 | Fukumori | 714/14 |
| 7,143,298 B2 * | 11/2006 | Wells et al. | 713/300 |
| 7,500,115 B2 * | 3/2009 | Berke et al. | 713/300 |
| 7,523,332 B2 * | 4/2009 | Schumacher et al. | 713/323 |

FOREIGN PATENT DOCUMENTS

CN     1776567     5/2006

OTHER PUBLICATIONS

Chinese Office Action dated Mar. 10, 2010.

* cited by examiner

*Primary Examiner* — Stefan Stoynov
(74) *Attorney, Agent, or Firm* — Dale F. Regelman; Quarles & Brady LLP

(57) ABSTRACT

A method to detect component removal while operating in a battery backup mode, comprising providing power from a battery backup unit (BBU) to a control card memory device, and measuring the current drawn by the control card memory device. If the current drawn by the control card memory device is less than or equals a pre-determined disconnect current, the method determines if a BBU release pin has been asserted. If the BBU release pin has been asserted, the method encodes in an event log a battery backup removal event. If the BBU release pin has not been asserted, the method encodes in the event log a control card removal event.

15 Claims, 4 Drawing Sheets

US 7,962,776 B2

METHOD AND APPARATUS FOR DETECTING COMPONENT REMOVAL WHILE OPERATING IN A BATTERY BACKUP MODE

FIELD OF THE INVENTION

This invention relates to a method and apparatus for detecting component removal while operating in a battery backup mode.

BACKGROUND OF THE INVENTION

Computing systems generate information. It is known in the art to store such information using a data storage system comprising a plurality of data storage media. In such a data storage library, information is stored in arrays of data storage media to provide fault tolerance and improved data access performance.

Data is initially stored in a volatile memory device in a control card. In the event of a power failure, the data encoded in such a volatile memory device could be lost.

SUMMARY OF THE INVENTION

Applicants' invention comprises a method to detect component removal while operating in a battery backup mode. The method provides a control card comprising a control card volatile memory device, where that control card is interconnected to a battery backup unit ("BBU") comprising a processor, event log, a BBU release pin, and one or more batteries. The method further provides power from the battery backup unit to the control card memory device, and measures the current drawn by the control card memory device.

If the current drawn by said control card memory device is less than or equals a pre-determined disconnect current, the method determines if the BBU release pin has been asserted. If the BBU release pin has been asserted, the method encodes in the event log a battery backup removal event. If the BBU release pin has not been asserted, the method encodes in the event log a control card removal event.

BRIEF DESCRIPTION OF THE DRAWINGS

The invention will be better understood from reading the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
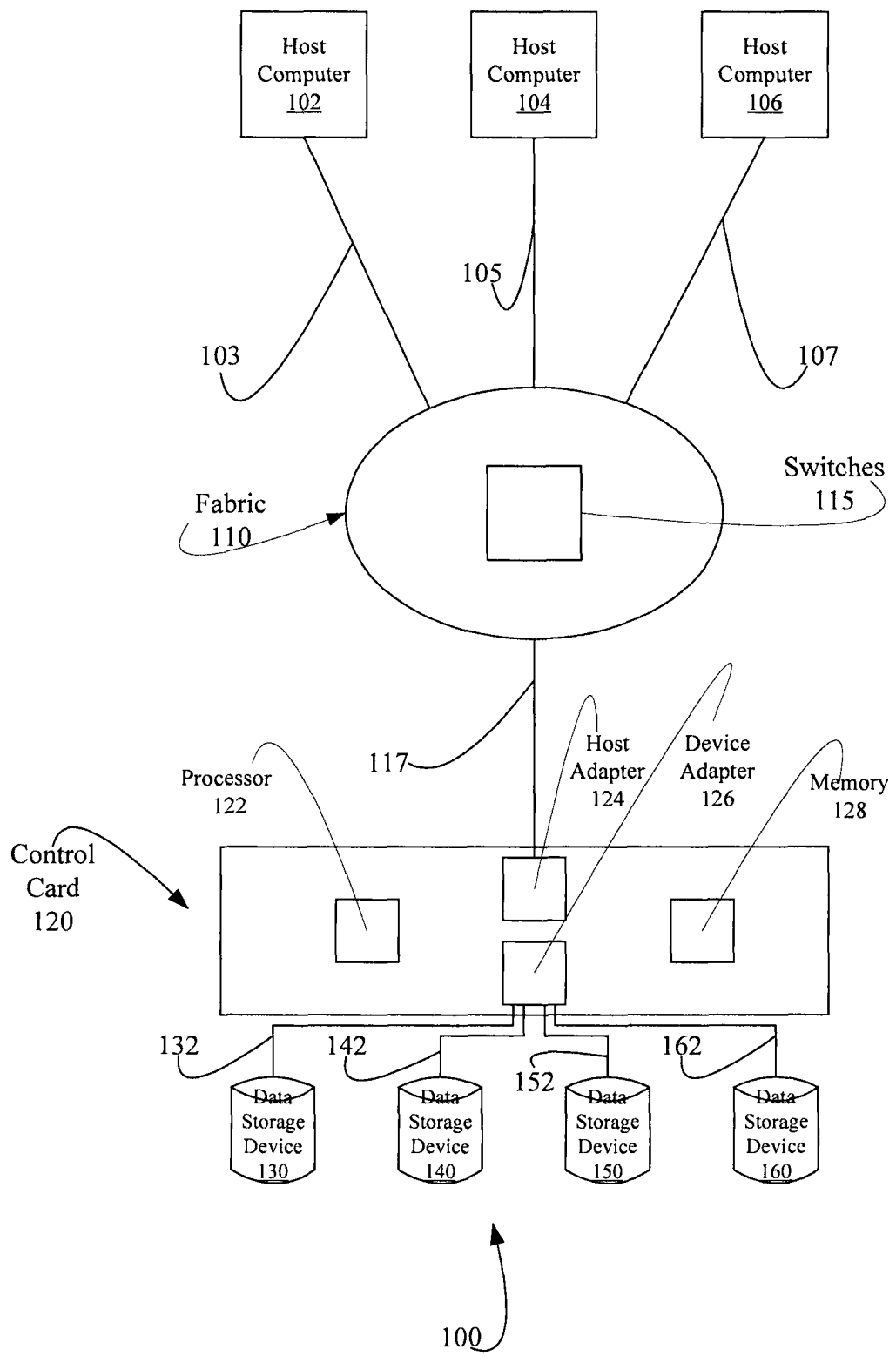
FIG. 1 is a block diagram showing one embodiment of Applicants' data storage system.

In the illustrated embodiment of FIG. 1, data storage system 100 comprises control card 120 and data storage media 130, 140, 150, and 160. In the illustrated embodiment of FIG. 1, control card 120 communicates with data storage media 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' control card 120 is in communication with host computers 102, 104, and 106. As a general matter, hosts computers 102, 104, and 106, each comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, Applicants' control card 120 comprises processor 122, host adapter 124, device adapter 126, and control card's volatile memory 128.

Data from one or more of host computers 102, 104, and/or 106, is initially stored in control card's volatile memory 128 before being written to one or more of data storage devices 130, 140, 150, and/or 160.

In the illustrated embodiment of FIG. 1, host computers 102, 104, and 106, are connected to fabric 110 utilizing I/O protocols 103, 105, and 107, respectively. I/O protocols 103, 105, and 107, may be any type of I/O protocol, for example, a Fibre Channel ("FC") loop, Infiniband, Gigabit Ethernet, Ethernet, TCP/IP, iSCSI, SCSI I/O interface, a direct attachment to fabric 110 or one or more signal lines used by host computers 102, 104, and 106, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 102, 104, and 106, to control card 120 via I/O protocol 117. I/O protocol 117 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from control card 120, and subsequently data storage media 130, 140, 150, and 160. In other embodiments, one or more host computers, such as for example and without limitation host computers 102, 104, and 106, communicate directly with control card 120 using I/O protocols 103, 105, and 107, respectively.

In certain embodiments, Applicants' data storage system comprises a battery backup unit ("BBU") which provides power to Applicants' control card in the event of a power failure. For example and referring now to FIG. 2, BBU 310 is capable of providing power to control card 120 via power bus 320. In the illustrated embodiment of FIG. 2, power supply 360 provides power to control card 120 and BBU 310 via power bus 330. Further in the illustrated embodiment of FIG. 2, power supply 360 provides power to data storage devices 130, 140, 150, and 160, via power bus 340.

Figure 2:
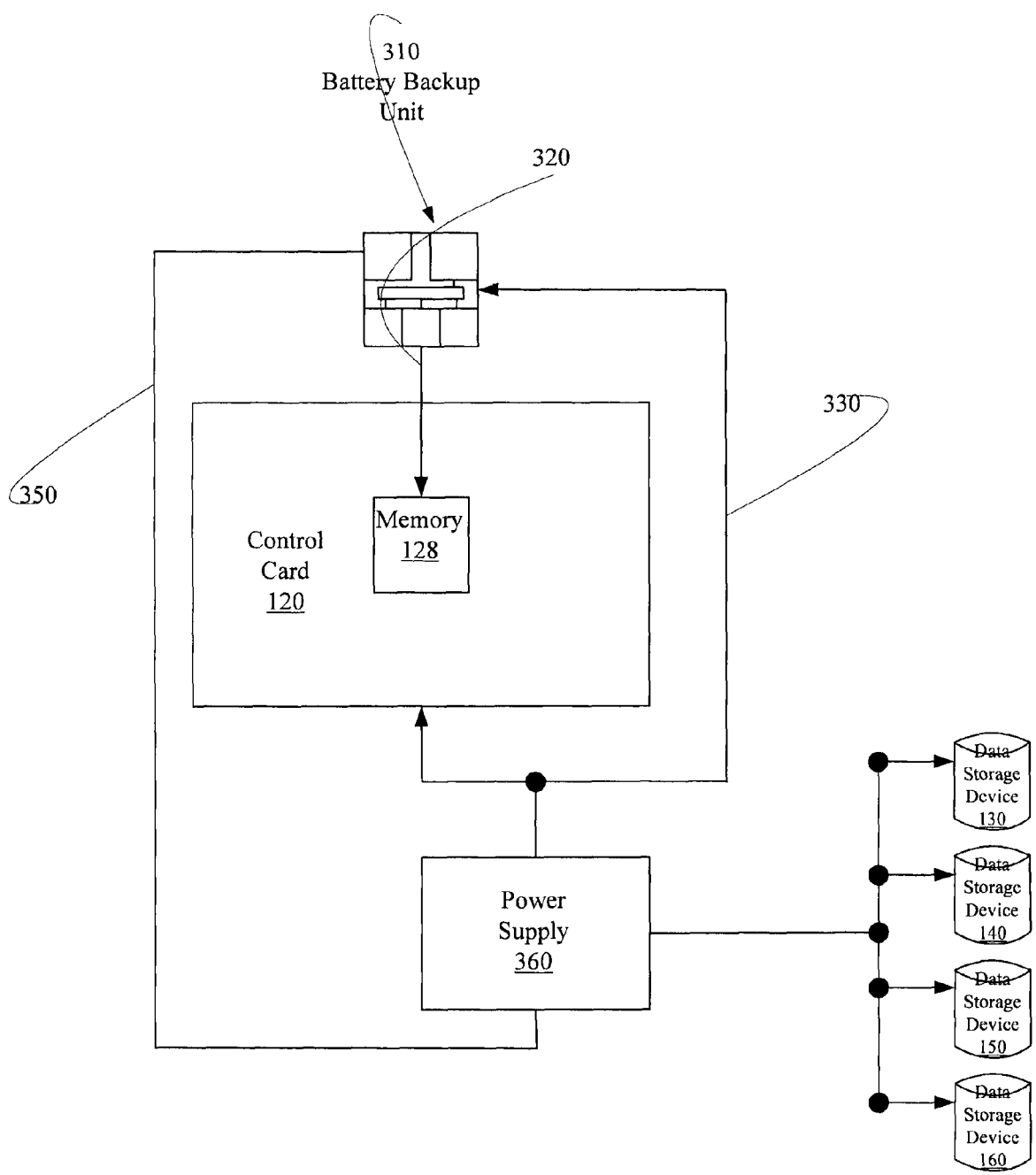
FIG. 2 illustrates Applicants' battery backup assembly interconnected to a control card.
Figure 3:
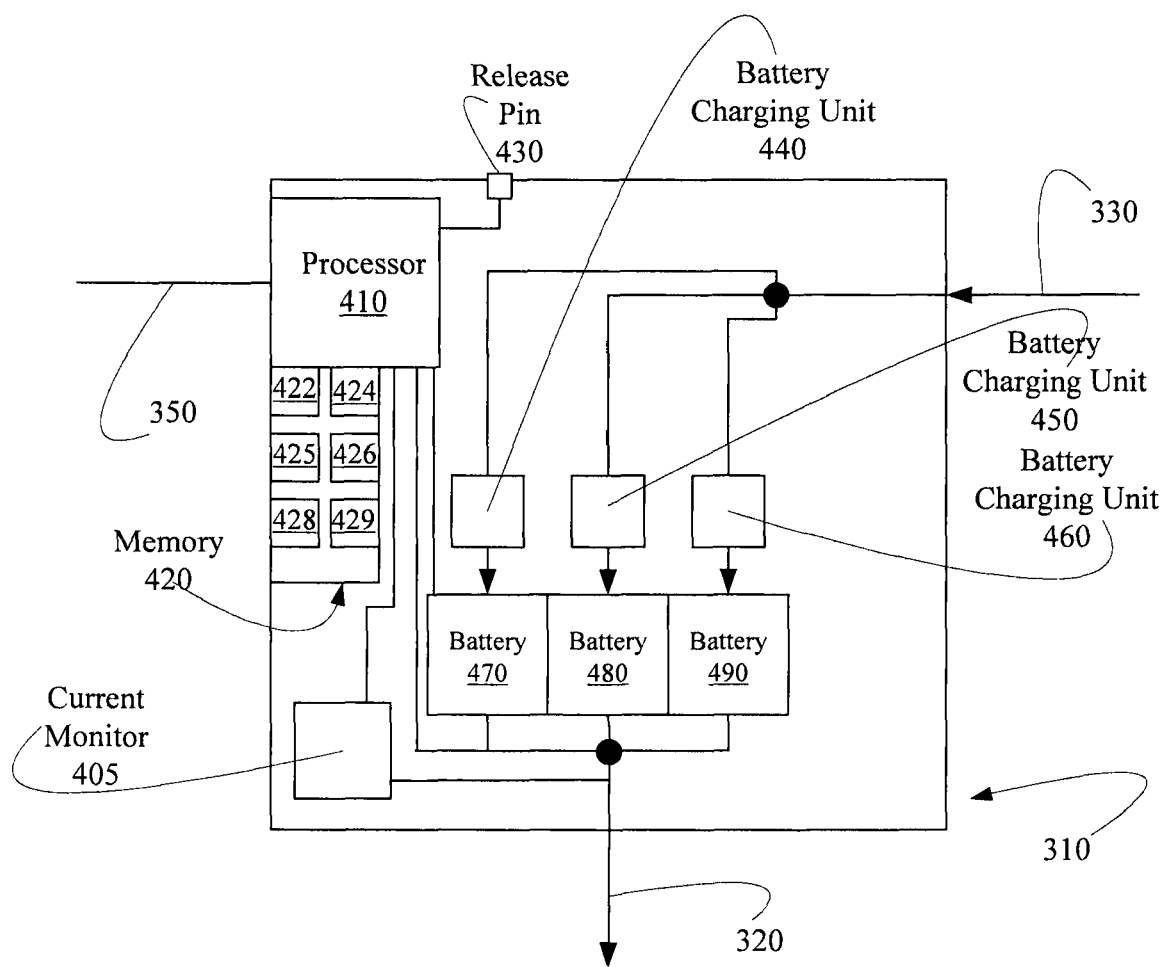
FIG. 3 is a block diagram illustrating Applicants' battery backup assembly.

Referring now to FIGS. 2 and 3, BBU 310 comprises processor 410, non-volatile memory 420, release pin 430, battery charging units 440, 450, 460, and rechargeable batteries 470, 480, and 490. Communication link 350 interconnects power supply 360 and processor 410. In certain embodiments, BBU 310 comprises fewer than 3 battery charging units and 3 rechargeable batteries. In certain embodiments, BBU 310 comprises more than 3 battery charging units and 3 rechargeable batteries.

Microcode/Firmware/Software 422, nominal power level value 424, fault power level value 425, disconnect power level 426, event log 428, and instructions 429, are encoded in non-volatile memory 420. Current monitor 405 measures the current being drawn in power bus 320, and provides that value to processor 410.

Figure 4:
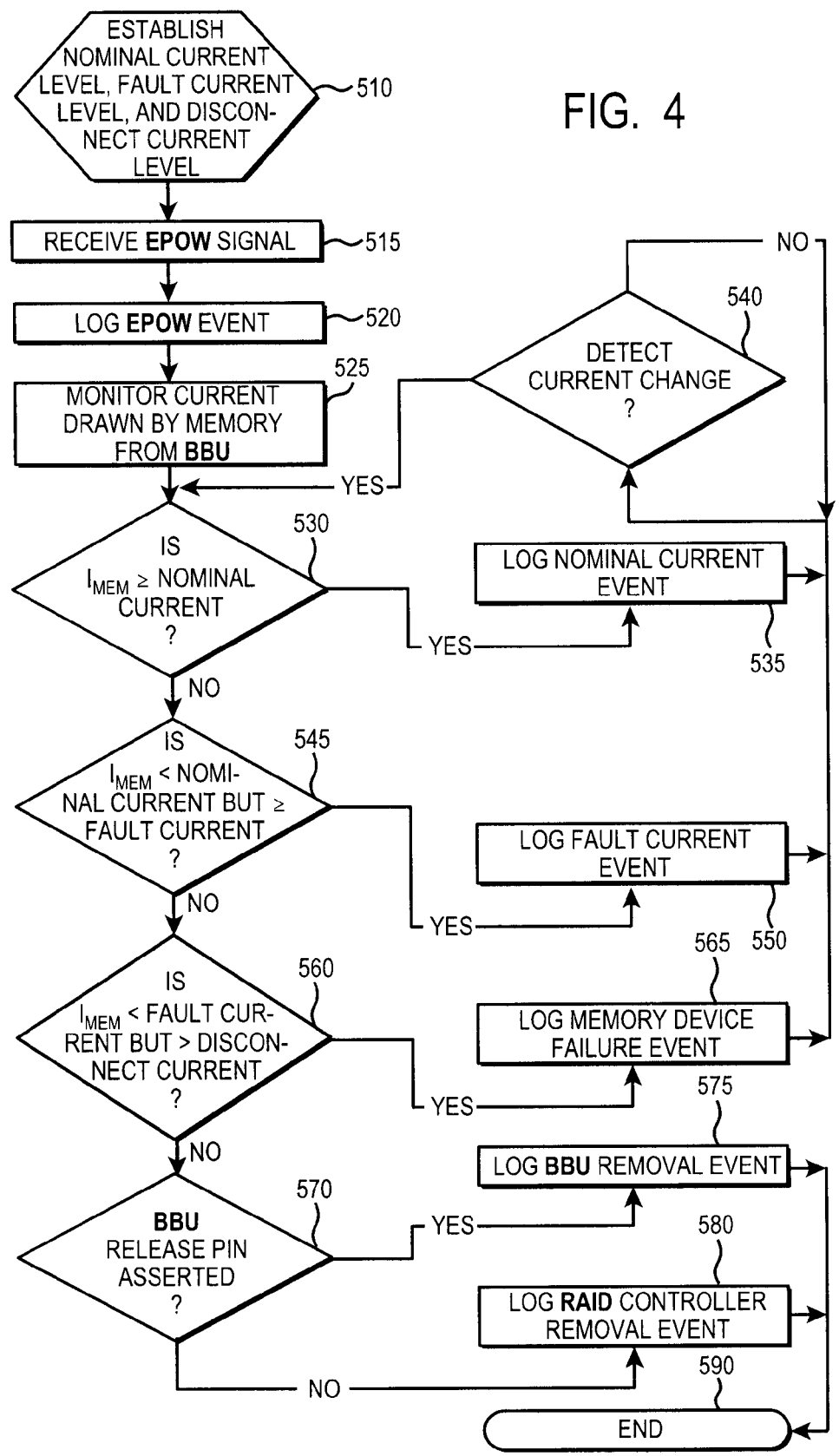
FIG. 4 is a flow chart summarizing the steps of Applicants' method.

Applicants' invention includes a method to log power events while Applicants' BBU is providing power to Applicants' control card. FIG. 4 summarizes Applicants' method.

Referring to FIG. 4, in step 510 the method establishes a nominal current level, a fault current level, and a disconnect current level, wherein the nominal current level is greater than the fault current level, and wherein the fault current level is greater than the disconnect current level. The nominal current level is set to a value that indicates that a memory device is connected and is actively refreshing. A fault current level is set to a value that indicates that a memory device is connected but is not refreshing.

The disconnect current level is set to a value that indicates that the control card comprising the memory device has been disconnected from the BBU. In certain embodiments, the disconnect current level is set to 0. In certain embodiments, the disconnect current level is set to greater than 0.

In certain embodiments, the current levels of step 510 are determined by the manufacturer of a battery backup unit, such as BBU 310 (FIGS. 2,3). In certain embodiments, the current levels of step 510 are determined by the manufacturer of a control card, such as control card 120 (FIGS. 2,3). In certain embodiments, the current levels of step 510 are determined by the manufacturer of a data storage system comprising a control card and a battery backup unit, such as data storage system 100 (FIG. 1).

In step 515, Applicants' method receives an early power off warning ("EPOW") signal. In certain embodiments, the EPOW signal of step 515 is generated by one or more power supplies, such as power supply 360A and/or power supply 360B, disposed in Applicants' information storage and retrieval system.

In step 520, Applicants' method logs the EPOW signal of step 515. In certain embodiments, step 520 is performed by a processor disposed in a BBU interconnected to the reporting power supply of step 520. In certain embodiments, step 520 comprises logging the date and time the EPOW signal was received. In certain embodiments, step 520 comprises encoding the EPOW signal and the date and time the signal was received in a log, such as log 428, disposed in a BBU.

In step 525, the method provides power from a BBU to a memory device, and monitors the current drawn by that memory device. In certain embodiments, the memory device of step 525 is disposed in a control card. In certain embodiments, a current monitor, such as current monitor 405, disposed in the BBU measures the current drawn by the memory device.

In step 530, the method determines if the current drawn by the memory device is greater than or equal to the nominal current level of step 510. In certain embodiments, step 530 is performed by a processor disposed in the BBU providing the power to the memory device.

If the method determines in step 530 that the current drawn by the memory device is greater than or equal to the nominal current level of step 510, then the method transitions from step 530 to step 535 wherein the method logs a nominal current event. In certain embodiments, step 535 is performed by a processor disposed in the BBU providing the power to the memory device. In certain embodiments, step 535 comprises encoding a measured current level, and a date and time the current was measured, in a log, such as log 428, disposed in a BBU.

The method transitions from step 535 to step 540 wherein the method determines if the current drawn by the memory device changes. In certain embodiments, step 540 is performed by a processor disposed in the BBU providing the power to the memory device.

If no change in the current is detected in step 540, then the method continues to monitor the current drawn from the BBU by the memory device during the power failure event. Alternatively, if the current drawn by the memory device changes, then the method transitions from step 540 to step 530 and continues as described herein.

If the method determines in step 530 that the current drawn by the memory device is not greater than or equal to the nominal current level of step 510, then the method transitions from step 530 to step 545 wherein the method determines if the current drawn by the memory device is greater than or equal to the fault current. In certain embodiments, step 545 is performed by a processor disposed in the BBU providing the power to the memory device.

If the method determines in step 545 that the current drawn by the memory device is greater than or equal to the fault current of step 510, then the method transitions from step 545 to step 550 wherein the method logs a fault current event. In certain embodiments, step 550 is performed by a processor disposed in the BBU providing the power to the memory device. In certain embodiments, step 550 comprises encoding a measured current level, and a date and time the current was measured, in a log, such as log 428, disposed in a BBU. The method transitions from step 550 to step 540 and continues as described herein.

If the method determines in step 545 that the current drawn by the memory device is not greater than or equal to the fault current level of step 510, then the method transitions from step 545 to step 560 wherein the method determines if the current drawn by the memory device is greater than the disconnect current. In certain embodiments, step 560 is performed by a processor disposed in the BBU providing the power to the memory device.

If the method determines in step 560 that the current drawn by the memory device is greater than the disconnect current level of step 510, then the method transitions from step 560 to step 565 wherein the method logs a memory device failure event. In certain embodiments, step 565 is performed by a processor disposed in the BBU providing the power to the memory device. In certain embodiments, step 565 comprises encoding a measured current level, and a date and time the current was measured, in a log, such as log 428, disposed in a BBU. The method transitions from step 565 to step 540 and continues as described herein.

If the method determines in step 560 that the current drawn by the memory device is less than or equals the disconnect current level of step 510, then the method transitions from step 560 to step 570 wherein the method determines if a BBU release pin, such as for example BBU release pine 430, has been asserted. A BBU release pin is automatically asserted when a BBU unit is removed from Applicants' information storage and retrieval system.

If the method determines in step 570 that a BBU release pin disposed a the BBU has been asserted, wherein that BBU was providing power to a memory device during a power failure event, then the method transitions from step 570 to step 575 wherein the method logs a BBU removal event. In certain embodiments, step 575 is performed by a processor disposed in the BBU that was providing power to the memory device. In certain embodiments, step 575 comprises encoding a measured current level, and a date and time the current was measured, in a log, such as log 428, disposed in a BBU. The method transitions from step 575 to step 590 and ends.

If the method determines in step 570 that a BBU release pin disposed a the BBU has not been asserted, wherein that BBU was providing power to a memory device during a power failure event, then the method transitions from step 570 to step 580 wherein the method logs a control card removal event. In certain embodiments, step 580 is performed by a processor disposed in the BBU that was providing power to the memory device. In certain embodiments, step 580 comprises encoding a measured current level, and a date and time the current was measured, in a log, such as log 428, disposed in a BBU. The method transitions from step 580 to step 590 and ends.

In certain embodiments, individual steps recited in FIG. 4, may be combined, eliminated, or reordered.

In certain embodiments, Applicants' invention includes instructions, such as instructions 429 (FIG. 3), residing in computer readable medium, such as for example memory 420 (FIG. 3), wherein those instructions are executed by a processor, such as processor 410 (FIG. 3), to perform one or more of steps 515, 520, 525, 530, 535, 540, 545, 550, 555, 560, 565, 570, 575, 580, and/or 590, recited in FIG. 4.

In other embodiments, Applicants' invention includes instructions residing in any other computer program product, where those instructions are executed by a computer external to, or internal to, Applicants' battery backup unit 310 (FIG. 2), to perform one or more of steps 515, 520, 525, 530, 535, 540, 545, 550, 555, 560, 565, 570, 575, 580, and/or 590, recited in FIG. 4. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to detect component removal while operating in a battery backup mode, comprising the steps of:
providing a control card comprising a control card memory device, wherein said control card is interconnected to a battery backup unit (BBU) comprising a processor, event log, a BBU release pin, and one or more batteries;
providing power from said battery backup unit to said control card memory device; and
measuring the current drawn by said control card memory device;
generating an early power off warning signal by said power supply;
providing said early power off warning signal to said processor;
if the current drawn by said control card memory device is less than or equals a pre-determined disconnect current, determining if said BBU release pin has been asserted;
if the current drawn by said control card memory device is less than or equals said disconnect current and if said BBU release pin has been asserted, encoding in said event log a battery backup removal event.

2. The method of claim 1, further comprising the step of encoding in said event log a control card removal event if the current drawn by said control card memory device is less than or equals said disconnect current and if said BBU release pin has not been asserted.

3. The method of claim 1, further comprising the steps of:
determining if the current drawn by said control card memory device is greater than or equal to a pre-determined nominal current;
if the current drawn by said control card memory device is greater than or equal to said pre-determined nominal current, encoding in said event log a nominal current event.

4. The method of claim 3, further comprising the steps of:
determining if the current drawn by said control card memory device is less than said nominal current but greater than or equal to a pre-determined fault current;

if the current drawn by said control card memory device is less than said nominal current but greater than or equal to said pre-determined fault current, encoding in said event log a fault current event.

5. The method of claim 4, further comprising the steps of:
determining if the current drawn by said control card memory device is less than said fault current but greater than said pre-determined disconnect current;
if the current drawn by said control card memory device is less than said fault current but greater than said pre-determined disconnect current, encoding in said event log a memory device failure event.

6. The method of claim 5, further comprising the steps of:
continuing to measure the current drawn by said control card memory device.

7. The method of claim 4, wherein said battery backup unit comprises a non-volatile BBU memory device, said method further comprising the steps of:
establishing said nominal current;
establishing said fault current;
establishing said disconnect current;
encoding said nominal current in said BBU memory device;
encoding said fault current in said BBU memory device;
encoding said disconnect current in said BBU memory device.

8. The method of claim 7, further comprising the step of encoding said event log in said non-volatile BBU memory device.

9. An article of manufacture comprising a processor, an event log, one or more batteries, and a computer readable medium having computer readable program code disposed therein to provide power to a control card memory device disposed in an interconnected control card, wherein said article of manufacture is interconnected with a power supply interconnected to said control card, the computer readable program code comprising a series of computer readable program steps to effect:
providing power to said control card memory device; and
measuring the current drawn by said control card memory device;
receiving an early power off warning signal from said power supply;
if the current drawn by said control card memory device is less than or equals a pre-determined disconnect current, determining if said BBU release pin has been asserted;
if the current drawn by said control card memory device is less than or equals said disconnect current and if said BBU release pin has been asserted, encoding in said event log a battery backup removal event.

10. The article of manufacture of claim 9, said computer readable program code further comprising a series of computer readable program steps to effect encoding in said event log a control card removal event if the current drawn by said control card memory device is less than or equals said disconnect current and if said BBU release pin has not been asserted.

11. The article of manufacture of claim 9, said computer readable program code further comprising a series of computer readable program steps to effect:
determining if the current drawn by said control card memory device is greater than or equal to a pre-determined nominal current;
operative if the current drawn by said control card memory device is greater than or equal to said pre-determined nominal current, encoding in said event log a nominal current event.

12. The article of manufacture of claim 11, said computer readable program code further comprising a series of computer readable program steps to effect:
determining if the current drawn by said control card memory device is less than said nominal current but greater than or equal to a pre-determined fault current;
if the current drawn by said control card memory device is less than said nominal current but greater than or equal to said pre-determined fault current, encoding in said event log a fault current event.

13. The article of manufacture of claim 12, said computer readable program code further comprising a series of computer readable program steps to effect:
determining if the current drawn by said control card memory device is less than said fault current but greater than said pre-determined disconnect current;
if the current drawn by said control card memory device is less than said fault current but greater than said pre-determined disconnect current, encoding in said event log a memory device failure event.

14. The article of manufacture of claim 13, said computer readable program code further comprising a series of computer readable program steps to effect continuing to measure the current drawn by said control card memory device.

15. A data storage system, comprising a control card comprising a memory device, and a battery backup assembly interconnected to said control card, said battery backup assembly comprising:
a processor;
an event log;
one or more battery charging units;
one or more rechargeable batteries interconnected to said one or more battery charging units;
an output power bus interconnected to said one or more rechargeable batteries;
a current measuring circuit interconnected to said output power bus and to said processor;
a non-volatile memory;
a nominal current value encoded in said non-volatile memory;
a fault current value encoded in said non-volatile memory;
a disconnect current value encoded in said non-volatile memory;
wherein said event log is encoded in said non-volatile memory.

* * * * *